Feb. 26, 1946.　　　　R. E. DAVIS　　　　2,395,399
MACHINE FOR SURFACING CONCRETE
Filed Sept. 26, 1942　　　2 Sheets-Sheet 1
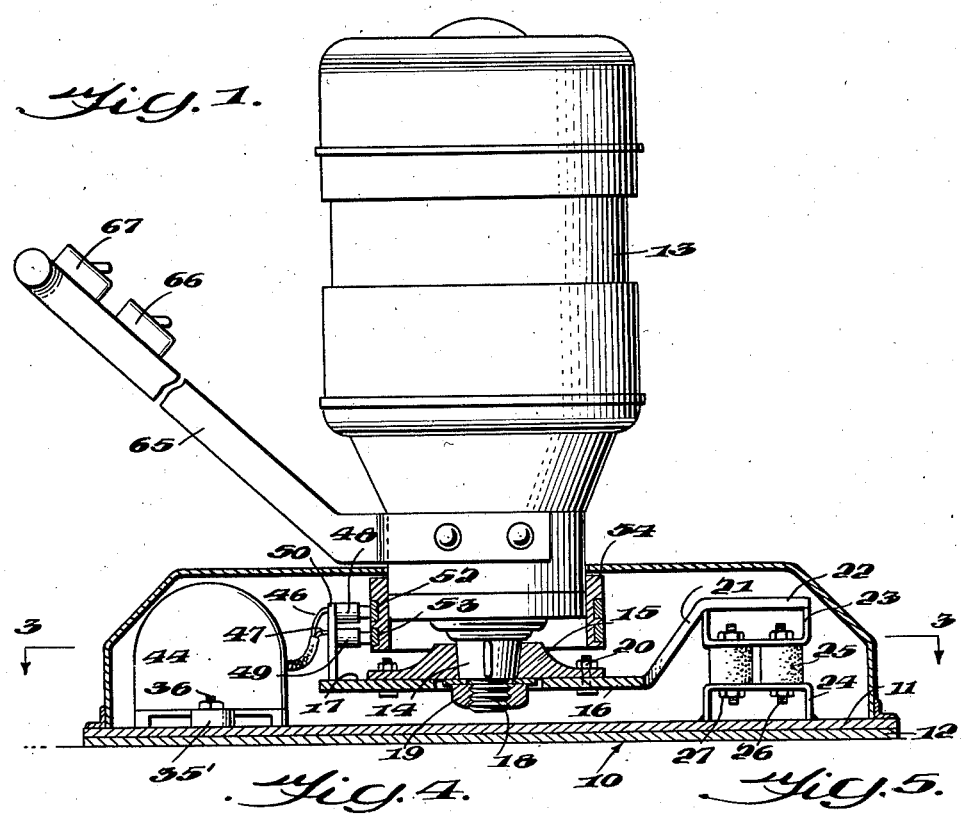
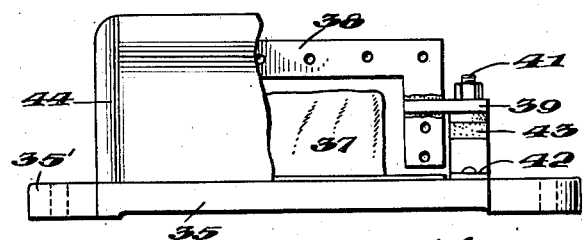
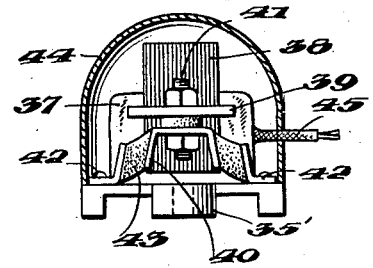
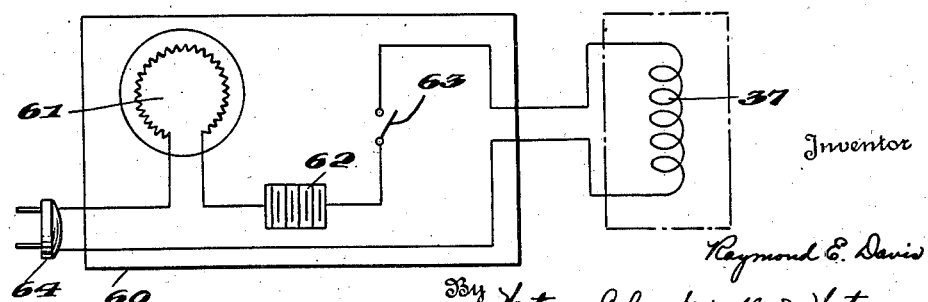
Inventor
Raymond E. Davis
By Watson, Cole, Grindle & Watson
Attorney Feb. 26, 1946.  R. E. DAVIS  2,395,399
MACHINE FOR SURFACING CONCRETE
Filed Sept. 26, 1942  2 Sheets-Sheet 2

Inventor
Raymond E. Davis
By Watson, Cole, Grindle & Watson
Attorney

Patented Feb. 26, 1946

2,395,399

UNITED STATES PATENT OFFICE 2,395,399

MACHINE FOR SURFACING CONCRETE

Raymond E. Davis, Berkeley, Calif., assignor to Kalman Floor Company, Inc., New York, N. Y., a corporation of Delaware Application September 26, 1942, Serial No. 459,813

3 Claims. (Cl. 94—45)

The present invention relates to machines or implements for laying concrete floors or for surfacing concrete slabs generally.

In Patent No. 2,289,247, granted July 7, 1942, there is disclosed and claimed a machine or implement which is primarily designed and intended to be used for the surfacing of concrete slabs or floors of relatively dry consistency, the machine having the capacity to surface in very effective manner a slab of freshly deposited concrete which is of such dry consistency that it could not be surfaced by hand tools or other instrumentalities known in the art. The patented implement includes a rotatable disc and, rigidly mounted upon such disc, a vibratory element, together with means for rotating the disc and simultaneously actuating the vibratory element so that, as the disc rotates about an axis, it likewise vibrates at high frequency. With the aid of this implement which thus includes a disc which rotates while vibrating at high frequency, it is possible to satisfactorily surface concretes of very dry consistency and the product produced is dense, homogeneous and wear resisting to an extraordinary degree.

The present invention contemplates an implement or machine by means of which the same advantageous results may be obtained, in some respects superior results, by the use of means which is somewhat different from that disclosed and claimed in the patent referred to. Thus, whereas in Patent No. 2,289,247 the vibration of the disc during its rotation is obtained by means of a rotating eccentric mounted upon the disc and arranged to rotate about a horizontal axis, in the implement of the present invention the vibration of the disc at high frequency is obtained with the use of magnetic vibrators, of which a plurality are preferably employed. Magnetic vibrators are, per se, well known and any suitable type of such vibrator may be employed. Preferably four are mounted upon the upper surface of the disc, being arranged in a circular series, equidistantly spaced circumferentially from each other and equidistantly spaced from the axis of rotation of the surfacing disc. An implement so constructed will serve efficiently as a surfacing tool, is simple in construction, durable, and easy to operate. The disc is caused to vibrate by magnetic vibrators of the type contemplated in a vertical direction only, i. e., in a direction normal to the plane of the disc, and this is a factor which may be of some advantage under certain circumstances.

One embodiment of the invention is illustrated in the accompanying drawings in which:

Figure 1 is a view, partially in side elevation, and partially in section, of the improved concrete surfacing implement;

Figure 4 is a side elevation, partially broken away of one of the several magnetic vibrators which are employed;

Figure 5 is an end view of the vibrator, portion of the casing being broken away as in Figure 4 in order that the operating elements may be more clearly perceived; and Figure 6 is a diagram showing the mains connecting one of the magnetic vibrators to a source of current supply, the various control instrumentalities being included.

Figure 2:
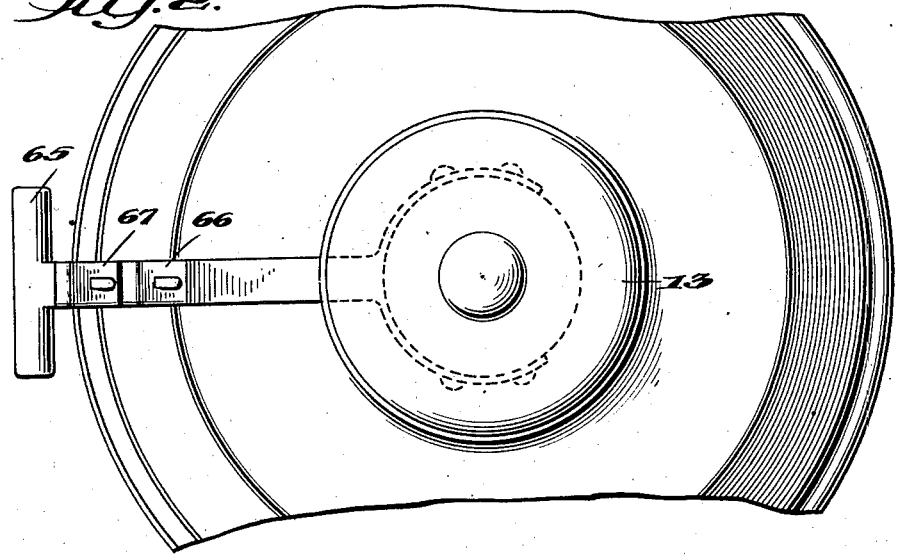
Figure 2 is a partial top plan view of the same.
Figure 3:
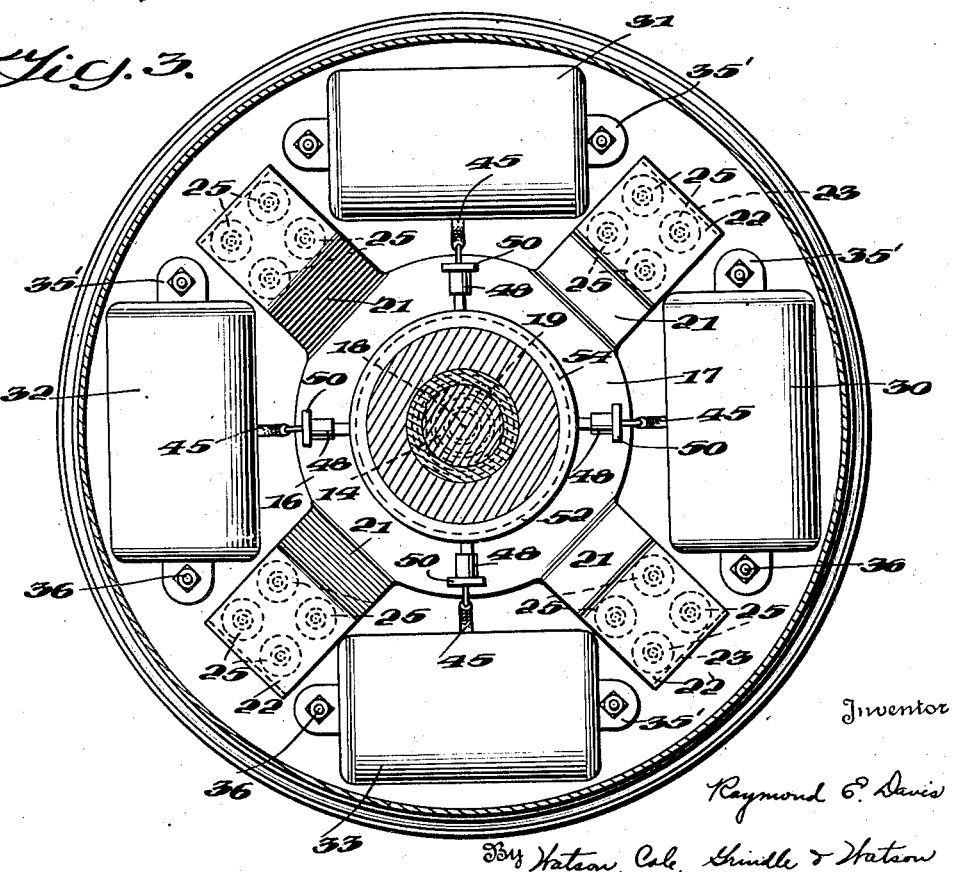
Figure 3 is a section on line 3—3 of Figure 1.

The concrete surface-engaging disc is generally indicated at 10, this disc being formed in two portions, the upper portion 11 and the lower portion 12, the last mentioned portion in reality comprising a wear plate being detachably connected to the upper portion 11 in order that it may be replaced by a new plate when excessively worn.

The disc 10 is revolved, when in use, about a vertical axis by means of an electric motor 13 the axis of which motor is vertically disposed and coincident with the axis of rotation of the disc. The motor is preferably a gear motor and the power output shaft thereof projects downwardly, having a tapered portion 14 which is received within and closely engages a tapered recess formed in the hub 15 of a spider which is generally indicated at 16, spider 16 has a horizontally disposed central portion of annular shape, indicated at 17, which encircles the threaded lower end 18 of the motor output shaft and the securing nut 19 on the end of that shaft, the annular portion of the spider being secured by bolts 20, at spaced points, to the periphery of the hub 15.

The spider 16 has four radially extending arms, each such arm having an upwardly and outwardly inclined portion 21 and a horizontally disposed terminal portion 22. To the underside of terminal portion 22 of each spider arm is rigidly secured a U-shaped member 23, as by welding, and this U-shaped member directly overlies a similar inverted U-shaped member 24 the ends of which are rigidly attached to the upper surface of disc 10, also preferably by welding. Intermediate the horizontal mid-portions of the two vertically spaced U-shaped members are short cylindrical elements 25 of resilient material, preferably rubber, each of these short cylindrical members being centrally apertured for the passage of a bolt 26, provided with usual securing nuts 27. It is the function of the resilient elements 25 to prevent vibratory movements of the disc 10 from being transmitted to the motor 13 while, at the same time, transmitting the weight of the motor downwardly to the disc in order that the disc will be tightly pressed against the concrete surface over which it may be passing. The bolts 26 positively connect the members 23 and 24 in such manner as to transmit the torque of the motor and spider to the disc, thus assuring rotation of the disc when the motor is supplied with current, but are incapable of transmitting vibration from the disc to the motor.

Fixed upon the upper surface of disc 10 is a circular series of magnetic vibrators, these vibrators being indicated at 30, 31, 32 and 33, respectively. No claim of novelty is made with respect to the vibrators, which are known per se, and a brief description only of one of these vibrators will be given. This vibrator is shown most clearly in Figures 4 and 5 and is seen to comprise a relatively heavy base plate 35 having extensions 35' perforated for the reception of bolts or studs 36 by means of which the base plate may be attached to the disc 10. Mounted upon the base 35 of each vibrator is a magnetic coil 37 and associated with the magnetic coil is an armature assembly 38 in the form of an inverted U, horizontally disposed plates 39 at the ends of the armature assembly overlying resilient supports whereby the armature assembly is resiliently supported upon the base plate 35. Each such resilient support for the armature assembly includes the inverted U-shaped member 40 attached to the overlying plate 39 by means of a bolt 41, the downturned legs of the inverted U-shaped member 40 being resiliently connected to brackets 42 mounted on the base plate by resilient blocks 43 bonded both to the brackets and to member 40.

Enclosing the whole is a dome-shaped casing 44, the casing being perforated on one side for the passage of a cable 45. The cable 45 includes helical conductors 46 and 47 which lead to brushes 48 and 49, respectively, these brushes being mounted upon a pedestal 50 extending upwardly from the annular portion 17 of the spider previously described. The movable contacts of the brushes are resiliently thrust inwardly of the implement so as to be in constant engagement with rings 52 and 53, respectively which are supported upon the short cylinder 54 fabricated of insulating material and rigidly supported upon the lower end of the motor casing, as shown clearly in Figure 1. Rings 52 and 53 are connected by means not illustrated to a source of supply of electrical current and, when this connection is established the magnetic vibrator will be energized, the armature vertically reciprocating at a rate of at least 3600 vibrations per minute and, under some circumstances, up to 7200 vibrations per minute.

A control box is employed in association with the implement thus described, the control box being diagrammatically indicated at 60 in Figure 6. In it are included the rheostat 61, rectifier 62 and switch 63. In Figure 6 the magnetic coil of one of the magnetic vibrators is indicated diagrammatically at 37 and a plug, which may be plugged into any suitable source of current supply, is indicated at 64. An additional control switch for the vibrators may be mounted upon the operating handle 65 of the machine, such switch being indicated at 66. By its use the operator may conveniently energize or de-energize the several magnetic vibrators of the instrument as he desires. The second switch, indicated at 67, mounted upon the upper end of the operating handle 65, controls the passage of operating current to the motor 13, the circuit to this motor having, however, not been illustrated.

It will be understood that the rheostat controls the amplitude or power of the vibrator by increasing or decreasing the amperes of current. It may be of any desired type and provided with any suitable means whereby it may be manually adjusted. The rectifier 62 changes alternating current to pulsating uni-directional current for energizing the coil of the vibrator unit. There is a time interval between each two waves, thus giving the vibrator a long stroke and a degree of power not possible to obtain on alternating current. The air gap between the magnetic pole and the armature of the vibrator is closed and opened every cycle of the current, giving 3600 vibrations per minute and the heavy mass of the armature moving at such a high speed causes a positive flow of powerful vibration to the base plate and thus to the work over which the implement is passing. By the use of other types of magnetic vibrators which operate directly on alternating current it is possible to obtain 7200 vibrations per minute where the conventional 60 cycle current is used. A slower frequency but larger amplitude may be obtained by superimposing direct current on regular alternating current and by the use of thermionic valves.

One skilled in the construction and use of the magnetic vibrator will readily perceive that other specific types of such vibrators may be employed for that which has just above been briefly described. Within the import of the invention such substitutions may readily be made, the present invention pertaining, not to the details of construction of the vibrator per se, but only to the combination of the vibrator and rotating disc, in an implement of the type described. By the use of the implement most satisfactory results may be obtained, the rotating disc which is simultaneously vibrating vertically at high frequency, effecting the surfacing of the concrete, even of extraordinarily dry concrete, in a most satisfactory manner.

Having thus described the invention, what is claimed as new and desired to be secured by Letters Patent is:

1. An implement for surfacing concrete floors comprising a disc adapted to rest upon the surface of a relatively dry mass of freshly deposited concrete, an electric motor with its axis disposed normally to the disc, a spider fixed on the motor shaft and having a plurality of radially extending arms, means resiliently connecting the end of each such arm to said disc, whereby the disc may be driven by the motor and the motor is resiliently mounted on the disc, and a plurality of magnetic vibrators mounted on the disc, said vibrators being arranged in a circular series and each being located between two arms of the spider.

2. An implement for surfacing concrete floors comprising a disc adapted to rest upon the surface of a relatively dry mass of freshly deposited concrete, an electric motor with its axis disposed normally to the disc, a spider fixed on the motor shaft and having a plurality of radially extending arms, said spider having a central portion disposed closely adjacent and parallel to the central portion of said disc and the outer ends of the arms thereof being disposed in a plane parallel to the disc but more remote therefrom than the central portion of the spider, resilient means interposed between and connecting the end of each arm to said disc whereby the disc may be driven by the motor and the motor is resiliently mounted on the disc, and a series of magnetic vibrators directly mounted on the disc, each such vibrator being positioned intermediate two arms of the spider.

3. The combination set forth in claim 2 in which electric current supply lines leading to the magnetic vibrators include movable contacts mounted upon the spider and fixed contacts with which the first mentioned contacts have sliding engagement, said contacts being immediately above the central portion of the disc and horizontally opposite the ends of the spider arms.

RAYMOND E. DAVIS.